US012773909B2

(12) United States Patent
Penne et al.

(10) Patent No.: US 12,773,909 B2
(45) Date of Patent: Oct. 27, 2026

(54) SYSTEM AND METHOD FOR CONTROLLING A VEHICLE ELECTRIC MACHINE FOR TEMPERATURE AND POWER CONTROL

(71) Applicant: Ford Global Technologies, LLC, Dearborn, MI (US)

(72) Inventors: Matthew Penne, Pierce, NE (US); Seth Loveall, Dearborn, MI (US); Papiya Bagchi, Northville, MI (US); Yang Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 18/737,327

(22) Filed: Jun. 7, 2024

(65) Prior Publication Data

US 2025/0376046 A1 Dec. 11, 2025

(51) Int. Cl.

| | |
|---|---|
| ***B60L 15/20*** | (2006.01) |
| ***B60L 7/16*** | (2006.01) |
| ***B60L 58/12*** | (2019.01) |

(52) U.S. Cl.

CPC ............. *B60L 15/2045* (2013.01); *B60L 7/16* (2013.01); *B60L 2210/40* (2013.01); *B60L 2240/34* (2013.01); *B60L 2240/421* (2013.01); *B60L 2240/423* (2013.01); *B60L 2240/545* (2013.01)

(58) Field of Classification Search

USPC ............................................................ 701/22

See application file for complete search history.

(56) References Cited

U.S. PATENT DOCUMENTS

| | | | |
|---|---|---|---|
| 8,636,622 B2 | 1/2014 | Ulrey et al. | |
| 11,757,147 B2 | 9/2023 | Xu et al. | |
| 2007/0272290 A1 | 11/2007 | Sims et al. | |
| 2023/0045430 A1* | 2/2023 | Okubo | B60L 7/24 |
| 2023/0093620 A1 | 3/2023 | He et al. | |
| 2025/0214394 A1* | 7/2025 | Turudic | B60H 1/00278 |

FOREIGN PATENT DOCUMENTS

| | | |
|---|---|---|
| CN | 116722780 A | 9/2023 |

OTHER PUBLICATIONS

Nian Zhang et al., "A harmonic injection method for improving NVH performance of permanent magnet synchronous motor", CDMMS 2020, Journal of Physics: Conference Series, 1802 (2021) 032132 doi: 10.1088/1742-6596/1802/3/032132, 6 pages.

* cited by examiner

*Primary Examiner* — Adam D Tissot

(74) *Attorney, Agent, or Firm* — David B. Kelley; Brooks Kushman, P.C.

(57) ABSTRACT

A vehicle includes a battery pack, an electric machine, and a control system including one or more controllers. The control system is configured to discharge power using the electric machine to increase operation loss of the electric machine based on a setting obtained from a drive input and a desired surplus loss limit in response to detecting at least one of a temperature deficiency or an excessive electric power characteristic of the battery pack.

19 Claims, 4 Drawing Sheets

SYSTEM AND METHOD FOR CONTROLLING A VEHICLE ELECTRIC MACHINE FOR TEMPERATURE AND POWER CONTROL

TECHNICAL FIELD

The present disclosure is generally directed to controlling an electrified vehicle having an electric machine, and more specifically for determining current commands for an electric machine.

BACKGROUND

Electrified vehicles (EV), such as fully electric, hybrid, and fuel cell vehicles, include electric drive systems for propulsion. An electric drive system may include an electric machine that operates as a motor to provide positive torque to a driveline and as a generator to produce electric power for charging a battery pack of the electrified vehicle, which may occur during a regenerative braking operation to slow the EV.

SUMMARY

In one form, the present disclosure is directed to a vehicle that includes a battery pack, an electric machine, and a control system including one or more controllers. The control system is configured to discharge power using the electric machine to increase operation loss of the electric machine based on a setting obtained from a drive input and a desired surplus loss limit in response to detecting at least one of a temperature deficiency or an excessive electric power characteristic of the battery pack.

In one form, the present disclosure is directed to a method for controlling a vehicle having an electric machine and a battery pack. The method includes charging the battery pack using the electric machine during a regenerative braking operation, and discharging power using the electric machine based on a setting obtained from a drive input and a desired surplus loss limit in response to detecting at least one of a temperature deficiency or an excessive electric power characteristic of the battery pack.

In one form, the present disclosure is directed to a control system for an electrified vehicle (EV) having a battery pack and an electric machine. The control system includes one or more controllers configured to discharge power from the battery pack using the electric machine based on a setting obtained from a correlation associating a current reference setting with a drive input and a desired surplus loss limit in response to detecting at least one of a temperature deficiency or an excessive electric power characteristic of the battery pack, wherein the drive input includes at least one of a normalized speed or a torque.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In one form, the present disclosure is generally directed to a system and/or method for an EV that discharges power using an electric machine to increase operation loss of the electric machine based on a setting in response to detecting at least one of a temperature deficiency or an excessive electric power characteristic of a battery pack of the EV. In a non-limiting example, the electric machine is operated to consume additional energy when the electric power of the battery pack is greater than or equal to a power threshold and/or when the temperature of the battery pack or the passenger cabin is equal to or less than a temperature setpoint. In one form, the setting is obtained from a current reference setting, a drive input, and a desired surplus loss limit. The electric drive system of the EV can be operated inefficiently by increasing a switching frequency of power electronics used for providing current to the electric machine and/or changing current commands to the electric machine.

Figure 1:
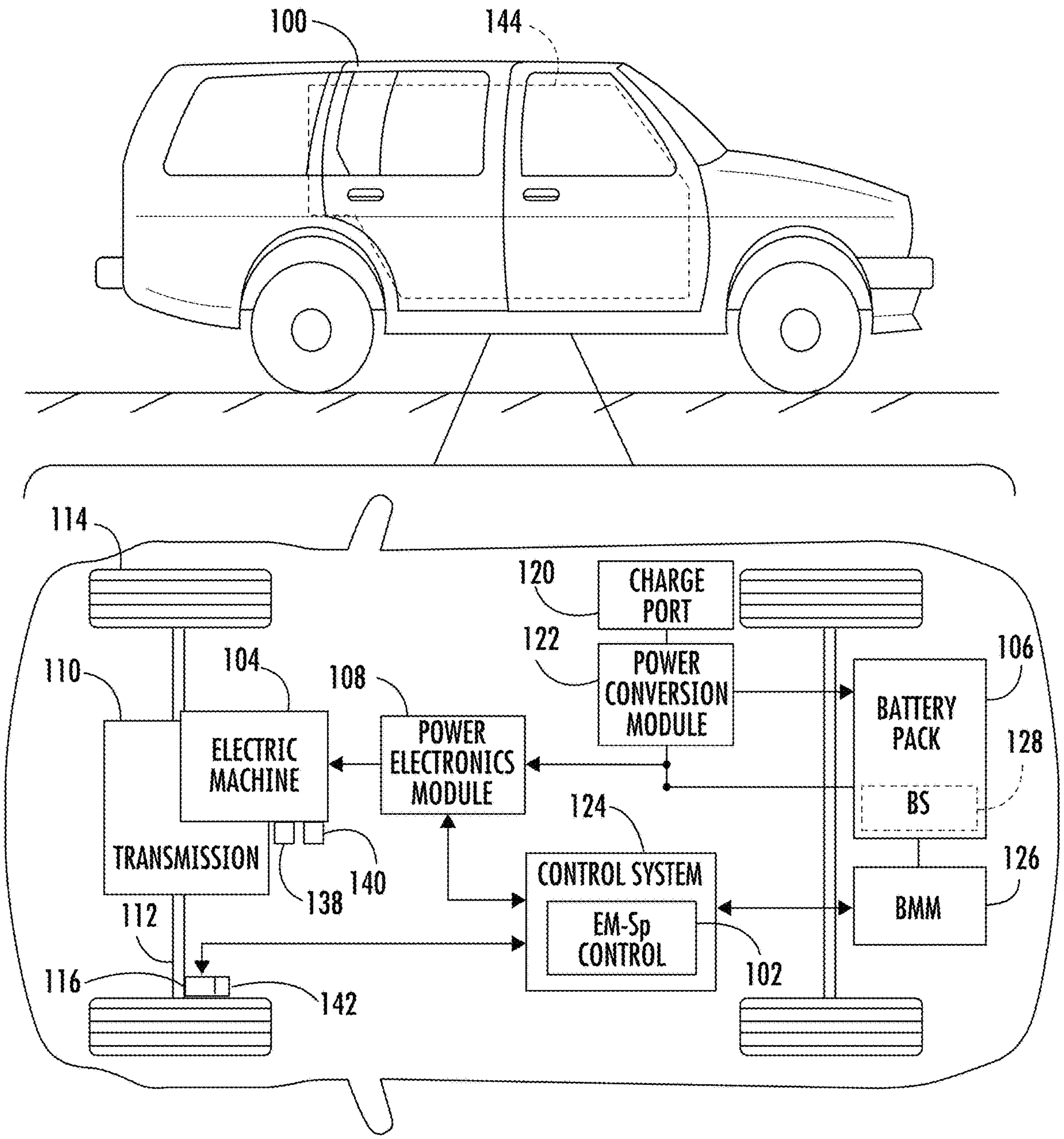
FIG. 1 is an example of an EV having an electric machine surplus (EM-Sp) control in accordance with the present disclosure.

Referring to FIG. 1, an electrified vehicle (EV) 100 is configured to include an electric machine surplus (EM-Sp) control 102 to have an electric machine (EM) 104 of the EV 100 consume additional power, as detailed herein. In one form, the EV 100 includes a powertrain system having one or more electric machines 104 (e.g., electric motor), a battery pack 106, and a power electronics module 108. The EV 100 of the present disclosure does not include an engine, and thus, the battery pack 106 provides all of the propulsion power. In other variations, the present disclosure may be applied to other types of EVs such as a hybrid electric vehicle (plug-in or non-plug-in) having an engine, fuel cell electric vehicles (FCEV), and therefore, is not limited to pure battery powered EVs. In addition, the EV is not limited to four-wheel automobiles and may apply to scooters, three-wheel vehicles, and/or among other vehicles.

The electric machine 104 provides power movement of the EV 100, and in a non-limiting example, is mechanically connected to a transmission 110 that is mechanically connected to a drive shaft 112, which is mechanically connected to wheels 114 of the EV 100. In addition to providing propulsion power, the electric machine 104 may be configured to operate as a generator to recover energy that may normally be lost as heat in a friction braking system having a brake pad 116. For example, during a regenerative braking operation during which the wheels 114 turn the electric machine 104 in an opposite direction using resistance, the electric machine 104 acts like a generator to recover part of the kinetic energy to charge battery cells of the battery pack 106, as the remaining energy is employed by the brake system to generate friction to slow and/or stop the EV 100.

The battery pack 106 provides a high-voltage (HV) direct current (DC) output that is employed to power the electric machine 104 via the power electronics module 108. In one form, the power electronics module 108, which may include an inverter, provides a bi-directionally transfer energy between the battery pack 106 and the electric machine 104. In a non-limiting example, the power electronics module 108 converts the DC voltage to a three-phase AC current to operate the electric machine 104, and in a regenerative mode, the power electronics module 108 converts three-phase AC current from the electric machine 104, which is acting as a generator, to DC voltage compatible with the battery pack 106.

In some variations, the battery pack 106 is rechargeable by an external power source (e.g., the grid) via an electric vehicle supply equipment (EVSE) that is electrically connected to a charge port 120 of the EV 100. In some forms, the EV 100 may further include a power conversion module 122 that is an on-board charger having a DC/DC converter to condition power supplied from the EVSE and provide the proper voltage and current levels to the battery pack 106.

In one form, the EV 100 includes a control system 124, which may also be referred to as a "vehicle controller," to coordinate the operation of the various components. The control system 124 includes electronics, software, or both, to perform the necessary control functions for operating the EV 100. The control system 124 may be a combination vehicle control system and powertrain control module (VSC/PCM). Although the control system 124 is shown as a single device, the control system 124 may include multiple controllers in the form of multiple hardware devices, or multiple software controllers with one or more hardware devices. In this regard, a reference to a "controller" herein may refer to one or more controllers.

As the powertrain control module, the control system 124 is configured to control the electric machine 104 as a motor to propel the EV 100 or generator using the power electronics module 108. In one form, the control system 124 is configured to define current reference settings or, stated differently current commands, for the electric machine 104, where the current reference setting provides a direct or flux current (Id) and a quadrature or torque current (Iq). During non EM-Sp control 102, the control system 124 is configured to define Id/Iq so as to minimize electric drive system losses.

The control system 124 is also configured to control a braking operation by employing the brake pads 116 and/or performing a regenerative braking operation using the electric machine 104 to reduce the speed of the EV 100. In one form, the frictional force for slowing the EV 100 may be provided by the brake pads 116 or the electric machine 104.

In one form, the EV 100 includes a battery management module (BMM) 126 configured to estimate one or more operating characteristics of the battery pack 106, such as but not limited to: current, voltage, state of charge (SOC), power limits, open circuit voltage, and/or temperature. The BMM 126 is in communication with one or more battery sensors (BS) 128 (e.g., voltage sensor, current sensor, temperature sensor) provided in the battery pack 106 to detect characteristics employed for determining one or more of the operating characteristics.

The EV 100 also includes one or more sensors throughout the EV 100 to detect various characteristics in and/or around the EV 100. In a non-limiting example, the sensors include: one or more temperature sensors 138 that detect the temperature around the electric machine 104; a torque sensor 140 that is configured to measure a torque of the electric machine 104; and a speed sensor 142 for measuring rotational speed of the wheel 114.

The control system 124 is configured to include the EM-Sp control 102 to employ the electric motor 104 to adjust power of the battery pack 106 when an excessive electric power characteristic or excessive energy level is detected and/or to regulate a temperature deficiency of the EV 100 (e.g., temperature of the battery pack 106 or temperature of a passenger cabin 144 of the EV 100 is low).

In using regenerative braking, the electric machine 104 charges the battery pack 106, and at times, the power characteristics of the battery pack 106 may be excessive (e.g., greater than or equal to a power threshold) such that additional charging during regenerative braking may reach a power capacity of the battery pack 106. For example, if the power characteristics is measured in terms of SOC, and the power threshold is set to 98%, the additional charging during regenerative braking may increase the SOC to a higher value that may be unsuitable for the battery pack 106. In some form, the power threshold is provided as a surplus power threshold or range that identifies one or more limits at which the EM-Sp control 102 is to be employed to have the electric machine 104 consume additional power that may be later regenerated during a braking operation. For example, the EM-Sp control 102 is activated when the SOC is equal to or greater than 95% and deactivated when the SOC is equal to or less than 90%. While specific values are provided, it should be readily understood that other power thresholds may be employed. In addition to or in lieu of SOC, the power characteristic of the battery pack 106 may be measured in terms of voltage and/or power limit.

Figure 2:
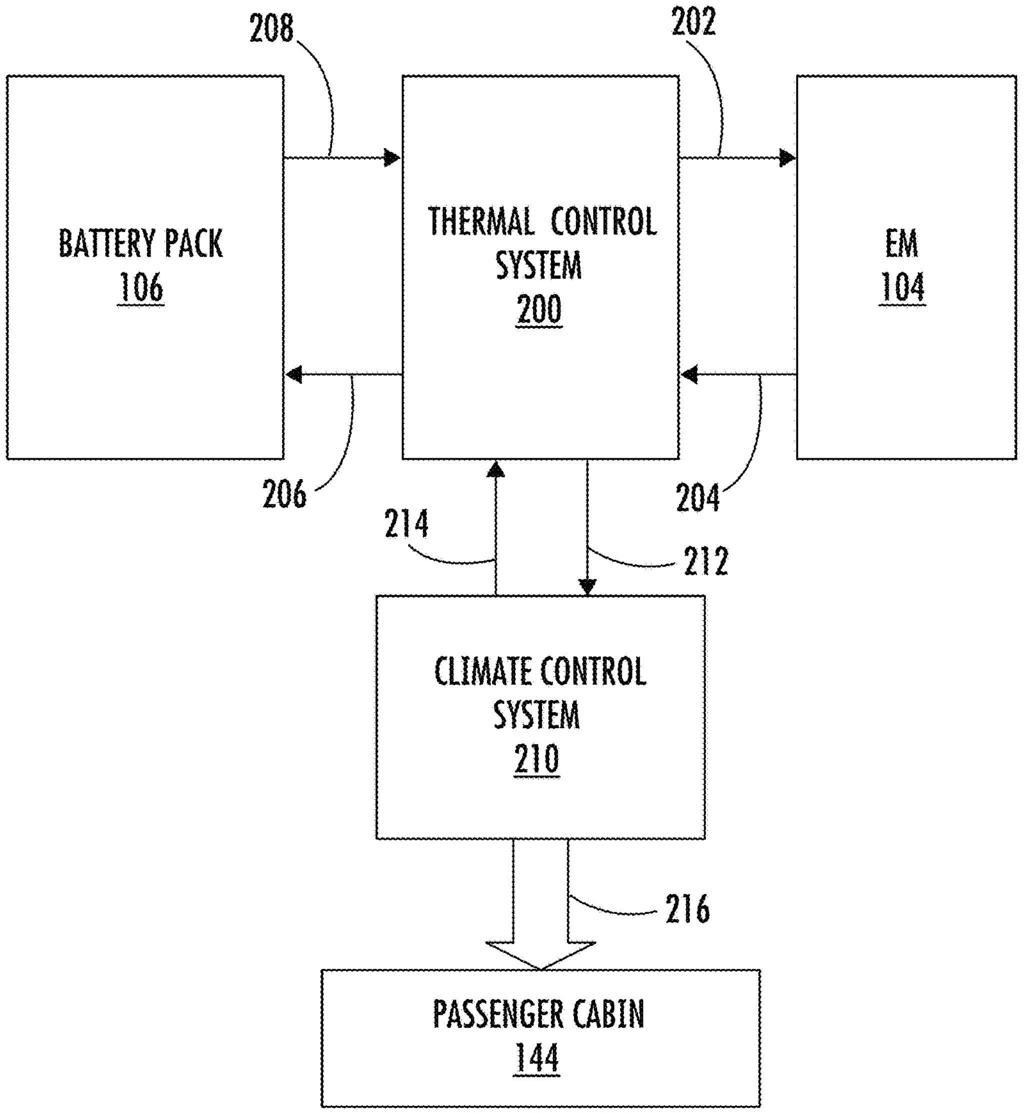
FIG. 2 is a block diagram of a thermal control system for controlling temperature of various systems of the EV in accordance with the present disclosure.

With respect to temperature deficiency, the EM-Sp control 102 is provided to increase temperature of the electric machine 104 and employ the thermal energy from the electric machine 104 to heat other areas of the EV 100 having a low temperature, such as the battery pack 106 and/or the passenger cabin 144. In a non-limiting example, referring to FIG. 2, a thermal control system 200 is configured to control the temperature of the electric machine 104, the battery pack 106 and the passenger cabin 144. In one form, the thermal control system 200 is configured to provide a fluid (e.g., coolant) to the electric machine 104 (e.g., arrow 202) that travels through passages of the electric machine to absorb heat and therefore reduce the temperature of the electric machine 104. The fluid then flows to the battery pack 106 (arrows 204 and 206) to transfer thermal energy from the fluid to the battery pack 106 when the temperature of the battery pack 106 is colder than the fluid. Alternatively, the fluid may absorb heat from the battery pack 106 if the battery pack 106 is hotter than the fluid. From the battery pack 106, the fluid is returned to the thermal control system 200 (arrow 208) where it may be cooled/heated before being provided to the electric machine 104.

In some applications, to heat the passenger cabin 144, the thermal control system 200 provides the fluid (arrow 212) to a climate control system 210 to heat/cool the passenger cabin 144. In a non-limiting example, the climate control system 210 includes: conduit for transporting the fluid; a blower for drawing air from outside of the EV 100; a heat exchanger for transferring heat to/from the fluid from/to air drawn in by the blower and blowing across fins of the heat exchanger; and a series of passages defined by a housing that supplies conditioned air (arrow 216) to the passenger cabin. Heated/cooled fluid from the climate control system 210 is provided back to the thermal control system 300 (arrow 214) to be circulated through, at least, the electric machine 104. While specific components are identified for the climate control system 210, the system 210 may include other components, such as but not limited to temperatures sensors for measuring temperature at the passenger cabin 144 and/or through the climate control system 210 (e.g., temperature of air leaving heat exchanger), air-direction doors provided in the housing to direct and mix the conditioned air, and/or a condenser.

In a non-limiting example, the thermal control system 200 includes: a fluid system including conduit for transporting fluid to/from the electric machine 104, the battery pack, and the climate control system 210; thermal expansion valve; and/or radiator. In one form, the thermal control system 200 is configured to include a controller to communicate with the control system 124, which may notify the thermal control system 200 of a temperature deficiency and possible request for EM-Sp control 102 of the electric machine 104.

In addition to or in lieu of heat generated by the electric machine 104, heat generated by the power electronics module 108, which includes the inverter, may also be used to heat the battery pack 106 and/or the passenger cabin 144 via the thermal control system 200 and fluid passages provided in the power electronic module 108 (not shown). In yet another variation, the thermal control system 200 may include a heat pump (not shown), and the heat generated by the electric machine 104 and/or the power electronics module 108 may be used to assist the heat pump in transferring heat to the passenger cabin.

Figure 3:
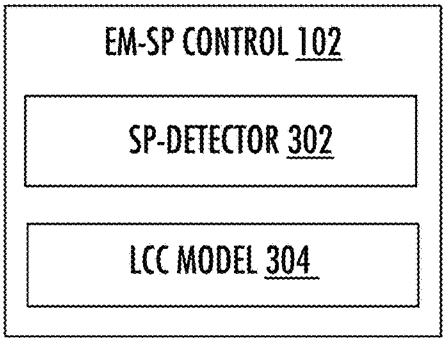
FIG. 3 is a block diagram of the EM-Sp control in accordance with the present disclosure.

Referring to FIG. 3, the EM-Sp control 102 includes a surplus detector (Sp-detector) 302 and a loss-current correlation model (LCC) 304. In one form, the Sp-detector 302 is configured to detect one or more surplus control (Sp-control) conditions and have the electric motor 104 operated to consume additional power in response to detecting the SP-control condition. As provided above, the SP-control conditions may include an energy level condition in which the power characteristics of the battery pack is greater than or equal to a power threshold (e.g., an upper power threshold) and/or a temperature deficiency condition in which the temperature of the battery pack 106 and/or the passenger cabin 144 is equal to or below a respective temperature setpoint.

Figure 4:
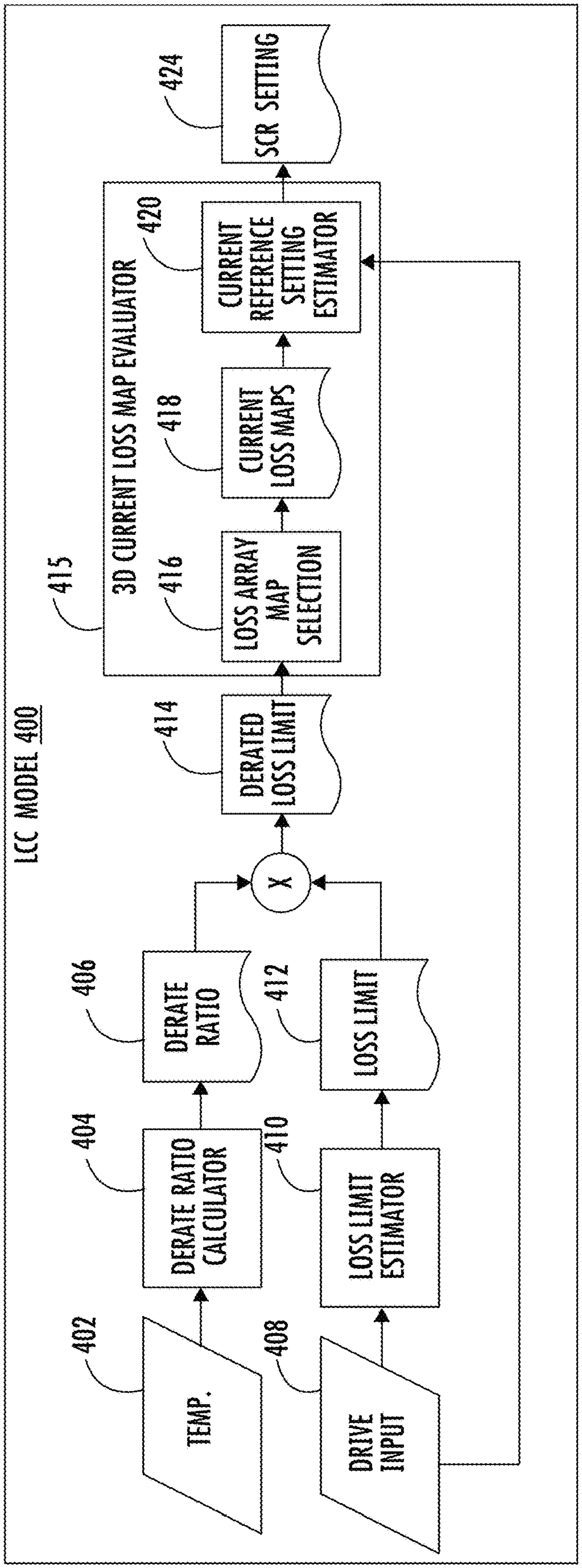
FIG. 4 is an example of a loss-current correlation model in accordance with the present disclosure.

When an Sp-control condition is detected, the control system 124 employs the EM-Sp control 102 to control the electric machine 104 using a surplus current reference (SCR) setting obtained from the LCC model 304. In one form, the LCC model 304 is configured to determine the SCR setting using a current reference setting, a drive input, and a desired surplus loss limit. In a non-limiting example, referring to FIG. 4, an LCC model 400 is used as the LCC model 304 to obtain the SCR setting. In one form, the LCC model 400 may be implemented in one or more software programs executable by a computing device and includes predefined information such as various correlation data and/or algorithms, as described herein.

The LCC model 400 obtains one or more temperature measurements 402 of at least one of ambient temperature around the electric machine 104, cooling fluid provided to the electric machine 104 (e.g., coolant from the thermal control system 200), ambient temperature about the EV 100, among other temperature measurements that can indicate operating condition of the electric machine 104.

A derate ratio calculator 404 uses the temperature 402 to estimate a derate ratio 406 that is employed to adjust the current reference settings for the electric machine 104 based on the operating condition. Specifically, the derate ratio 406 adjusts the current reference settings to provide a controlled loss of the electric machine 104 by accounting for possible stresses on the drive system. In one form, the derate ratio calculator 404 may be provided as a look-up table that associates temperature values with predefined derate ratios. In another form, the derate ratio calculator 406 is provided as one or more algorithms that uses the temperature 402 as a variable input to determine the derate ratio 406.

In some variations, if multiple temperature measurements 402 are obtained, the derate ratio calculator 404 determines the derate ratio 406 using the highest temperature measurement 402. In some variations, if multiple temperature measurements 402 are provided, the derate ratio calculator 404 estimates the derate ratio 406 for each temperature measurement. With multiple derate ratios 306, the derate ratio calculator 404 may be configured to select the highest derate ratio 406 or, alternatively, take an average of the derate ratios 406. While specific examples are provided for determining the derate ratio 406 using temperature 402, other methods may be used and are within the scope of the present disclosure.

In addition to the temperature 402, the LCC model 400 obtains drive inputs 408 that are employed to obtain a loss limit 412 using the loss limit estimator 410. The loss limit 412 is a recommended amount of loss of the electric machine 104 to meet the demand of the EV 100. In one form, the drive inputs 408 include torque of the electric machine 104 and normalized speed. In one form, the loss limit estimator 410 associates various torque and normalized speed values with a loss limit 412, and may be provided as one or more look-up tables.

Using the derate ratio 406 and the loss limit 412, a derated loss limit 414 is calculated. For example, the derated loss limit 414 is equal to the derate ratio 406 multiplied by the loss limit 412.

In one form, the LCC model 400 employs a three-dimensional (3D) loss map evaluator 415 for defining the SCR setting 424 based on the derated loss limit 414. Specifically, the evaluator 415 stores at least one current loss map for each loss limit among a plurality of loss limits. Each current loss map defines current reference settings, which may also be referred to as current commands (e.g., settings for Id/Iq), for different combinations of torque and normalized speed. The evaluator 415 selects at least one current loss map based on the derated loss limit 414 and then uses the drive inputs to obtain the SCR setting 424.

Specifically, a loss array map selector 416 is configured to select one or more current loss maps 418 based on the derated loss limit 414. Specifically, the loss array map selector 416 is configured to store a plurality of current loss maps (e.g., Id/Iq maps) for different loss levels. The loss maps indicate the amount of additional loss over a standard loss with a maximum torque per ampere (MTPA) calibration. For example, with an MTPA=50 Nm and normalized speed of 10 RPM/V, the standard calibration loss is 1070W, and with the with Sp-control condition, there would be an additional loss on top of the standard calibration loss.

The loss array map selector 416 is configured to select one or more current loss maps 420 based on the derate loss limit 414. Specifically, if there is no current loss map with the specific derate loss limit 414, the loss array map selector 416 selects a current loss map for a derate loss limit that is higher than the derate loss limit 414, which is referred to as a high loss map, and a current loss map for a derate loss that is lower than the derate loss limit 414, which is referred to as a low loss map.

A current reference setting estimator 420 is configured to determine the SCR setting 424, which is indicative of the Id and Iq commands for the electric machine 104 to obtain the desired derated loss limit. If there is one current loss map, the current reference setting estimator 420 selects the SCR setting 424 associated with the drive inputs 408. Alternatively, if there are high and low loss maps, the current reference setting estimator 420 is configured to define the SCR setting 424 using a high SCR setting associated with a high loss limit (e.g., a high surplus loss limit) from the high loss map and a low SCR setting associated with a low loss limit (e.g., a low surplus loss limit) from the low loss map.

The current reference setting estimator 420 is configured to interpolate the upper SCR setting and the lower SCR setting based on a relationship of the desired surplus loss limit, the upper surplus loss limit, and the lower surplus loss limit to obtain the SCR setting 424. In a non-limiting example, with the derated loss limit (DLL) being 2000W, the current loss maps for a high loss limit ($LL_{HIGH}$)=3000 and low loss limit ($LL_{LOW}$)=1000W are used to obtain the SCR setting 324. The low SCR setting from the low loss map is provided as $Id_{LOW}$=−100 and $Iq_{LOW}$=100 A, and the high SCR setting from the high loss map is provided as $Id_{HIGH}$=−200 A and $Iq_{HIGH}$=200 A. Equations 1 and 2 are example interpolation equation used for determining current commends for the SCR setting 424. The SCR setting 424 are employed to operate the electric machine 104 and provide surplus loss of the electric machine 104 during the Sp-control condition.

$$Id_{SCR} = \frac{Id_{HIGH} - Id_{LOW}}{LL_{HIGH} - LL_{LOW}} \times \frac{DLL - LL_{LOW}}{LL_{HIGH} - LL_{LOW}} + Id_{low} \quad \text{Equation 1}$$

$$Iq_{SCR} = \frac{Iq_{HIGH} - Iq_{LOW}}{LL_{HIGH} - LL_{LOW}} \times \frac{DLL - LL_{LOW}}{LL_{HIGH} - LL_{LOW}} + Iq_{low} \quad \text{Equation 2}$$

The LCC model 400 may be configured to include additional operations, such as but not limited to having a slew control to reduce or inhibit jumps in current. In one form, the LCC model 400 is integrated as part of a standard EM control in which loss array map selection may employ either the derated loss limit 414 or an unconditioned loss command for selecting the loss maps.

Figure 5:
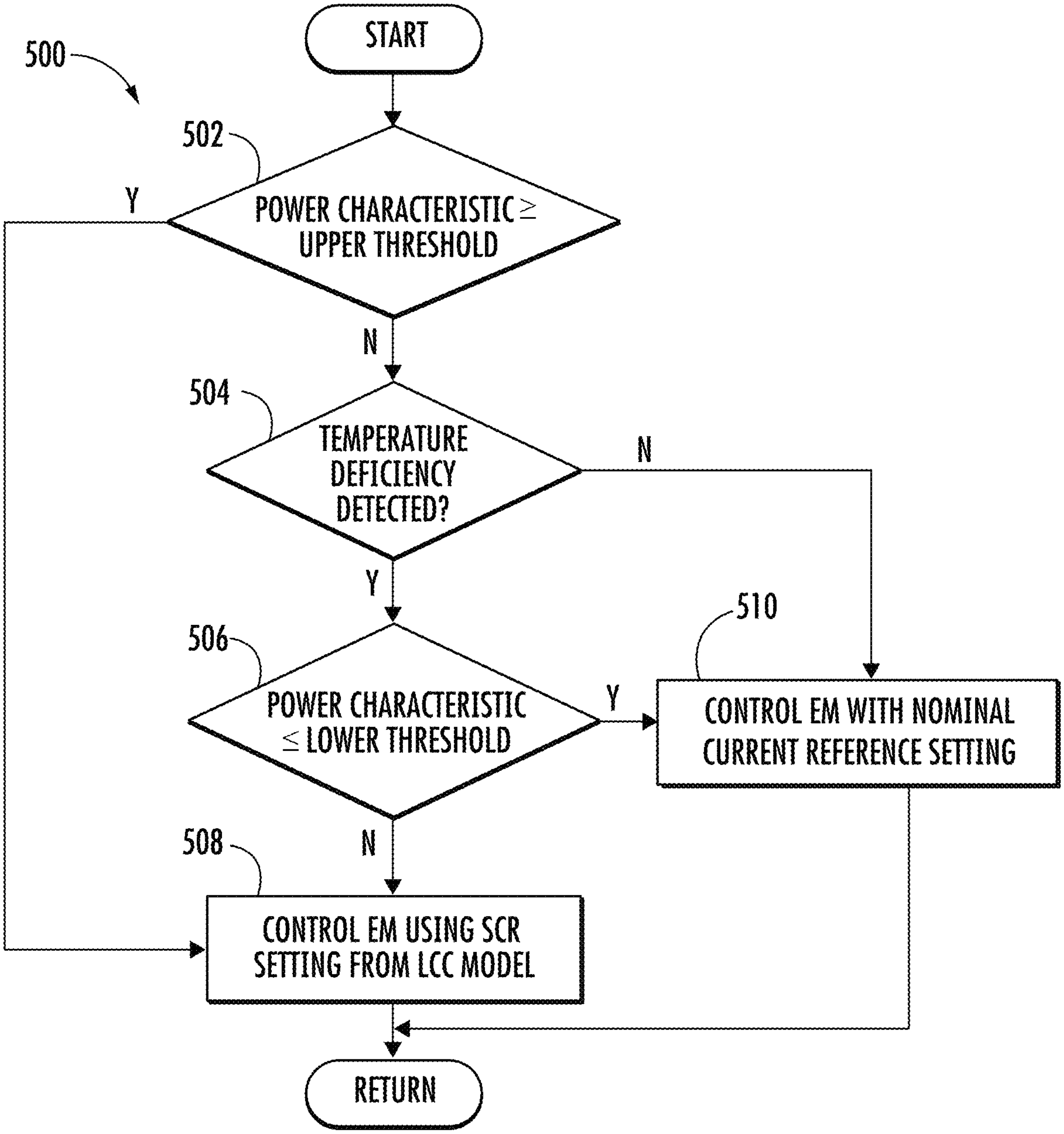
FIG. 5 is a flowchart of EM-Sp control routine in accordance with the present disclosure.

Referring to FIG. 5, an example EM-Sp control routine 500 is executed by the control system 124. At operation 502, the control system 124 determines if the power characteristic of the battery pack 106 is greater than or equal to an upper power threshold that may limit use of regenerative braking for charging the battery pack 106 (e.g., upper power threshold is SOC is ≥98%).

If the power characteristic is less than the upper power threshold, the control system 124 determines if there is a temperature deficiency in the EV 100, at operation 504. In a non-limiting example, using the temperature of the battery pack 106 and/or at the passenger cabin 144, the control system 124 determines if the temperature of the battery pack 106 and/or the temperature of the passenger cabin 144 is equal to or less than respective temperature setpoint (e.g., the temperature setpoint for the battery pack 106 may be defined by a manufacturer of the battery pack 106 and the temperature setpoint for the passenger cabin 144 may be a desired cabin temperature set by a user).

If there is a temperature deficiency, the control system 124 determines if a power characteristic of the battery pack 106 satisfies a selected threshold to limit power drawn from the battery pack 106, at operation 506. In a non-limiting example, the control system 124 determines if the SOC of the battery pack 106 is greater than or equal to a lower power threshold. The lower power threshold is indicative of a SOC value that is low (e.g., 20%) and therefore, the electric machine 104 is to be operated efficiently to limit power drawn from the battery pack 106.

If the power characteristic is greater than the lower power threshold or the power characteristic of the battery pack 106 is greater than or equal to the upper threshold (e.g., operation 502 is Yes), the control system 124 controls the electric machine 104 using the SCR setting that is determined based on the LCC model 400, at operation 508, as detailed above.

Alternatively, if the power characteristic is less than or equal to the lower power threshold (e.g., SOC is less than 20%) or the temperature deficiency is not detected (e.g., operation 504 is No), the control system 124 controls the electric machine 104 using nominal current reference settings and without an additional loss, at operation 510. For example, the control system 124 determines current reference setting using the drive inputs and a loss command dependent on the drive inputs.

With the EM-Sp control 102, the EV 100 may operate the electric machine 104 to generate additional heat that can be scavenged by thermal control system 200 to heat low temperature portions of the EV 100, such as but not limited to, the battery pack 106 and the passenger cabin 144. In addition, the etc. In one form, the inefficient operation of the electric machine 104 may also increase switching loss, which may result in increased temperature, of the power electronics (e.g., switches in the inverter). In addition, the EM-Sp control 102 further control the power characteristics of the battery pack 106 to assist in consistent use of regenerative braking.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory or memory device is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:

a battery pack;

an electric machine; and a control system including one or more controllers, the control system configured to discharge power using the electric machine to increase operation loss of the electric machine based on a setting obtained from a drive input and a desired surplus loss limit in response to detecting at least one of a temperature deficiency or an excessive electric power characteristic of the battery pack, wherein the control system is configured to:

identify at least one loss current correlation map from among a plurality of loss current correlation maps based on the desired surplus loss limit, each of the plurality of loss current correlation maps is associated with a different surplus loss limit and associates multiple surplus current reference (SCR) settings with multiple drive inputs for the surplus loss limit;

determine the setting using a desired loss current correlation map in response to the desired loss current correlation map being identified from among the plurality of loss current correlation maps for the desired surplus loss limit; and determine the setting using a first loss current correlation map and a second loss current correlation map in response to the plurality of loss current correlation maps not having the desired loss current correlation map for the desired surplus loss limit, wherein the first loss current correlation map is for a first surplus loss limit that is greater than the desired surplus loss limit and the second loss current correlation map is for a second surplus loss limit that is less than the desired surplus loss.

2. The vehicle of claim 1, wherein the drive input includes at least one of a normalized speed and a torque.

3. The vehicle of claim 1, wherein the temperature deficiency includes at least one:

a temperature of the battery pack being less than or equal to a temperature threshold, or a temperature of a passenger cabin being less than or equal to a desired cabin temperature.

4. The vehicle of claim 1, further comprising:

a thermal control system configured to provide fluid to the battery pack and the electric machine to control a temperature of the electric machine and the battery pack, wherein the control system is configured to increase operation loss of the electric machine to increase temperature of the electric machine in response to, as the temperature deficiency, a temperature of the battery pack being less than or equal to a temperature threshold to cause the thermal control system to increase the temperature of the battery pack using heat generated by the electric machine.

5. The vehicle of claim 1, further comprising:

a thermal control system configured to provide fluid to the electric machine to control a temperature of the electric machine; and a climate control system configured to transfer heat from the fluid to air to be supplied to a passenger cabin of the vehicle, wherein:

the control system is configured to increase operation loss of the electric machine to increase temperature of the electric machine in response to, as the temperature deficiency, a temperature of the passenger cabin being less than or equal to a desired cabin temperature to cause the climate control system to increase the temperature of the passenger cabin using heat generated by the electric machine.

6. The vehicle of claim 1, wherein the desired surplus loss limit is defined based on a derate loss ratio and a temperature measurement.

7. The vehicle of claim 1, further comprising a power electronic system including an inverter to control power to the electric machine in accordance with the setting.

8. A method for controlling a vehicle having an electric machine and a battery pack, comprising:

charging the battery pack using the electric machine during a regenerative braking operation;

identifying at least one loss current correlation map from among a plurality of loss current correlation maps based on a desired surplus loss limit, each of the plurality of loss current correlation maps is associated with a different surplus loss limit and associates multiple surplus current reference (SCR) settings with multiple drive inputs for the surplus loss limit;

determining a setting using a desired loss current correlation map in response to the desired loss current correlation map being identified from among the plurality of loss current correlation maps for the desired surplus loss limit;

determining the setting using a first loss current correlation map and a second loss current correlation map in response to the plurality of loss current correlation maps not having the desired loss current correlation map for the desired surplus loss limit, wherein the first loss current correlation map is for a first surplus loss limit that is greater than the desired surplus loss limit and the second loss current correlation map is for a second surplus loss limit that is less than the desired surplus loss limit; and discharging power using the electric machine based on the setting obtained from a drive input and the desired surplus loss limit in response to detecting at least one of a temperature deficiency or an excessive electric power characteristic of the battery pack.

9. The method of claim 8, wherein the drive input includes at least one of a normalized speed and a torque.

10. The method of claim 8, wherein the temperature deficiency includes at least one:

a temperature of the battery pack being less than or equal to a temperature threshold, or a temperature of a passenger cabin being less than or equal to a desired cabin temperature.

11. The method of claim 8, further comprising:

increasing operation loss of the electric machine to increase temperature of the electric machine in response to, as the temperature deficiency, a temperature of a passenger cabin being less than or equal to a desired cabin temperature; and exchanging, by a thermal control system, thermal energy from the electric machine to the passenger cabin.

12. The method of claim 8, further comprising:

increasing operation loss of the electric machine to increase temperature of the electric machine in response to, as the temperature deficiency, a temperature of the battery pack being less than or equal to a temperature threshold; and exchanging, by a thermal control system, thermal energy from the electric machine to the battery pack.

13. The method of claim 8, wherein the desired surplus loss limit is defined based on a derate loss ratio and a temperature measurement.

14. A control system for an electrified vehicle (EV) having a battery pack and an electric machine, comprising:

one or more controllers configured to:

identify at least one loss current correlation map from among a plurality of loss current correlation maps based on a desired surplus loss limit, each of the plurality of loss current correlation maps is associated with a different surplus loss limit and associates multiple surplus current reference (SCR) settings with multiple drive inputs for the surplus loss limit;

determine a setting using a desired loss current correlation map associated with the desired surplus loss limit in response to the desired loss current correlation map being identified from among the plurality of loss current correlation maps for the desired surplus loss limit;

determine the setting using a first loss current correlation map and a second loss current correlation map in response to the plurality of loss current correlation maps not having the loss current correlation map for the desired surplus loss limit, wherein the first loss current correlation map is for a first surplus loss limit that is greater than the desired surplus loss limit and the second loss current correlation map is for a second surplus loss limit that is less than the desired surplus loss limit; and discharge power from the battery pack using the electric machine based on the setting obtained from the at least one loss current correlation map identified using a drive input and the desired surplus loss limit in response to detecting at least one of a temperature deficiency or an excessive electric power characteristic of the battery pack, wherein the drive input includes at least one of a normalized speed or a torque.

15. The vehicle of claim 1, wherein the control system is configured to:

with the desired loss current correlation map, identify a desired SCR associated with the drive input, as the setting; and with the first loss current correlation map and the second loss current correlation map, identify a high SCR associated with the drive input from the first loss current correlation map and a low SCR associated with the drive input from the second loss current correlation map, and determine a desired SCR using the high SCR and the low SCR.

16. The vehicle of claim 15, wherein the control system is configured to determine the setting as an interpolation of the high SCR setting and the low SCR setting.

17. The method of claim 8, further comprising:

with the desired loss current correlation map, identifying a desired SCR associated with the drive input, as the setting; and with the first loss current correlation map and the second loss current correlation map, identifying a high SCR associated with the drive input from the first loss current correlation map and a low SCR associated with the drive input from the second loss current correlation map, and determining a desired SCR, as the setting, using the high SCR and the low SCR.

18. The method of claim 17, further comprising interpolating the high SCR setting and the low SCR setting to determine the desired SCR setting.

19. The control system of claim 14, wherein the one or more controllers is configured to with the desired loss current correlation map, identify a desired SCR associated with the drive input, as the setting; and with the first loss current correlation map and the second loss current correlation map, identify a high SCR associated with the drive input from the first loss current correlation map and a low SCR associated with the drive input from the second loss current correlation map, and determine a desired SCR using the high SCR and the low SCR.

* * * * *